March 29, 1955  D. HARRIS  2,705,316
LUGGAGE REMINDER FOR TAXICAB DRIVERS
Filed Dec. 24, 1953
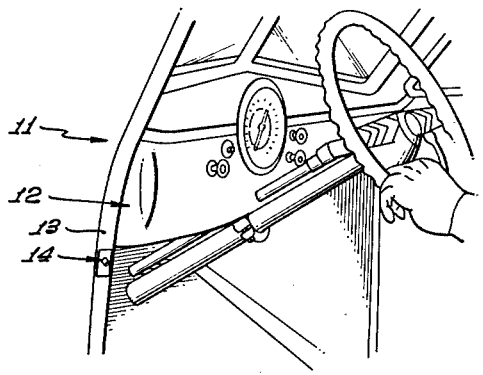
FIG. 3.
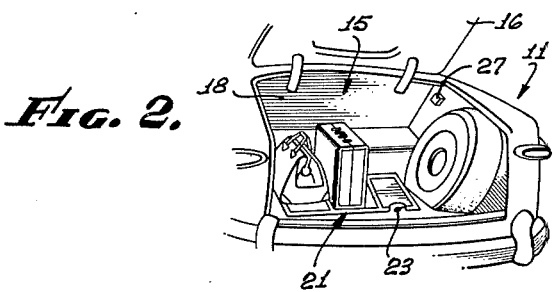
FIG. 2.
FIG. 1.
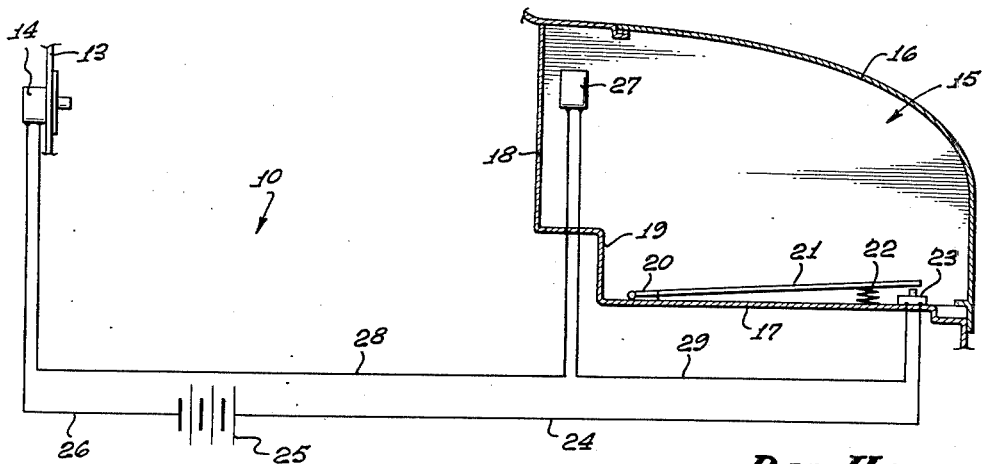
DEE HARRIS
INVENTOR.
BY
ATTORNEY.

United States Patent Office 2,705,316
Patented Mar. 29, 1955

2,705,316

LUGGAGE REMINDER FOR TAXICAB DRIVERS

Dee Harris, Los Angeles, Calif.

Application December 24, 1953, Serial No. 400,180

2 Claims. (Cl. 340—280)

This invention relates to taxicabs and particularly to the efficiency of taxicab service.

A frequent cause of embarrassment to taxicab drivers and their passengers occurs when the driver places the passenger's luggage in the luggage compartment of the taxicab and due to the hurry of getting the passenger to his destination, his luggage is for the moment forgotten and the passenger, without his luggage, takes the train or airplane which he is rushing to catch. The cost of sending the luggage after the passenger in such cases is very considerable and great inconvenience is caused the passengers.

It is an object of the present invention to provide a means for reminding the driver of a taxicab, when he delivers a passenger at his destination, that luggage for that passenger is stored in the luggage compartment of the cab and must be removed therefrom and delivered to the passenger.

The manner of accomplishing the foregoing object as well as further objects and advantages will be made manifest in the following description taken in connection with the accompanying drawings in which:

Fig. 1 is a diagrammatic view of the invention including a wiring diagram of the electric circuit thereof and illustrates the invention as when there is no luggage in the luggage compartment.

Fig. 2 is a perspective view of the luggage compartment of a taxicab with which the invention is incorporated, this view showing luggage in said luggage compartment resting on a displaceable switch actuating rack of the invention which is mounted on the floor of said compartment.

Fig. 3 is a fragmentary perspective view of the left front doorway of said taxicab with the door open as when the driver leaves the cab through said doorway in order to help his passenger to alight from the cab.

Referring specifically to the drawings, the luggage reminder 10 of the invention is there shown as incorporated with a taxicab 11, the left front doorway 12 of which has a front jam 13 upon which the left front door (not shown) is hinged to swing outwardly when said door is opened. Mounted in the jamb 13 is a normally closed switch 14 which is opened each time said left front door of the cab 11 is closed, by said door closing on said switch, and is closed each time said door is opened by said door swinging away from over said switch.

The taxicab 11 has a luggage compartment 15, access to which is had by an overhead door 16, the latter being normally closed and locked during travel. The compartment 15 includes a floor 17 and a back-wall 18 which are customarily connected by a step 19 provided to clear the differential casing (not shown) of the taxicab 11 during extreme flexing of the chassis springs.

Pivotally mounted at its front edge on hinges 20 which are secured to the floor 17 is a displaceable grid-like luggage supporting rack 21 which is normally held away from the floor 17 by one or more weak springs 22. Also mounted on the floor 17 is a normally open switch 23 which is positioned to be engaged by the rack 21 when it is swung downwardly as by placing a piece of luggage thereon so as to compress the spring 22.

One terminal of the switch 23 is connected by a conductor 24 to one side of the storage battery 25 of the taxicab 11 and the other side of said battery is connected by a conductor 26 to one terminal of the switch 14.

Mounted in any convenient place on the taxicab 11, and preferably in the luggage compartment 15 thereof, is an electric buzzer 27 one terminal of which is connected by a conductor 28 with the other terminal of the switch 14. The other terminal of said buzzer is connected by a conductor 29 with the other terminal of the switch 23.

*Operation*

Whenever the driver of cab 11 places luggage in the compartment 15, it displaces the rack 21 downward, closing the switch 23. This readies the device 10 to energize the buzzer 27 whenever the switch 14 is closed by opening of the left front door of cab 11.

Upon arrival of the cab 11 at the destination of a passenger whose luggage has been stored in the compartment 15, the driver brings the taxicab 11 to a halt and customarily leaves the cab by the left front door opening 12. This relieves the switch 14 of pressure from the left front door causing this switch to close the electric circuit of the reminder device 10 which energizes the buzzer 27 causing this to give an alarm which reminds the driver of the luggage in the compartment 15 belonging to the passenger leaving the taxicab at this stop. The driver thereupon closes the left front door of the cab, opens the luggage compartment 16 and removes and delivers to the passenger the luggage belonging to him.

It is thus seen that the reminder 10 of the present invention will prevent the taxicab driver forgetting that he has stored luggage in the compartment 15 for a passenger alighting from his cab and said invention will thus eliminate all of the consequent difficulties involved in restoring lost luggage to passengers.

While the electric signal means, employed by this invention for reminding the driver, preferably comprises an electric buzzer, it is to be understood that any other signal means might be employed for this purpose such as a bright red electric lamp which could be located on the dashboard of the taxicab 11. Furthermore, this signal lamp could have a thermal blinker switch in its circuit so that when energized, said lamp would blink rapidly thus attracting the driver's attention, and reminding him to remove his passenger's luggage from the compartment 15.

The claims are:

1. In a taxicab having a doorway through which the driver customarily passes in entering or leaving said taxicab, a door for closing said doorway, and a luggage compartment in which luggage belonging to passengers is occasionally stored during travel, the combination of: displaceable means mounted in said luggage compartment and adapted to be displaced from its normal position by the placing of luggage in said compartment; a first switch normally open and mounted in said luggage compartment and positioned to be closed by the displacing of said displaceable means caused by the introduction of luggage into said compartment; a second switch, normally closed, and mounted to be engaged by said door when the latter is closed so as to cause said second switch to open, and permitting said second switch to automatically close when said door is opened; electric signal means mounted on said taxicab; a battery on said taxicab; and conductors forming a circuit including said battery, said switches, and said signal means whereby the closing of both of said switches causes said signal means to give a signal to the driver of said taxicab indicating the presence of luggage in said luggage compartment.

2. In a taxicab having a luggage compartment with a door which is customarily closed during travel thereby concealing luggage stored therein, the combination of: displaceable means mounted in said luggage compartment so that said means is displaced from its normal condition by the placing of luggage in said compartment;

a second displaceable means actuated by the driver getting out of said taxicab; and signal means responsive to the concurrent actuation of the aforesaid two displaceable means to remind the driver of said taxicab of the presence of said luggage in said luggage compartment when said driver gets out of said taxicab to release from the latter the passenger to whom said luggage belongs.

References Cited in the file of this patent

UNITED STATES PATENTS

| | | |
|---|---|---|
| 2,349,740 | McCollum | May 23, 1944 |
| 2,466,355 | Baker | Apr. 5, 1949 |

FOREIGN PATENTS

| | | |
|---|---|---|
| 269,079 | Great Britain | Apr. 14, 1927 |